UNITED STATES PATENT OFFICE.

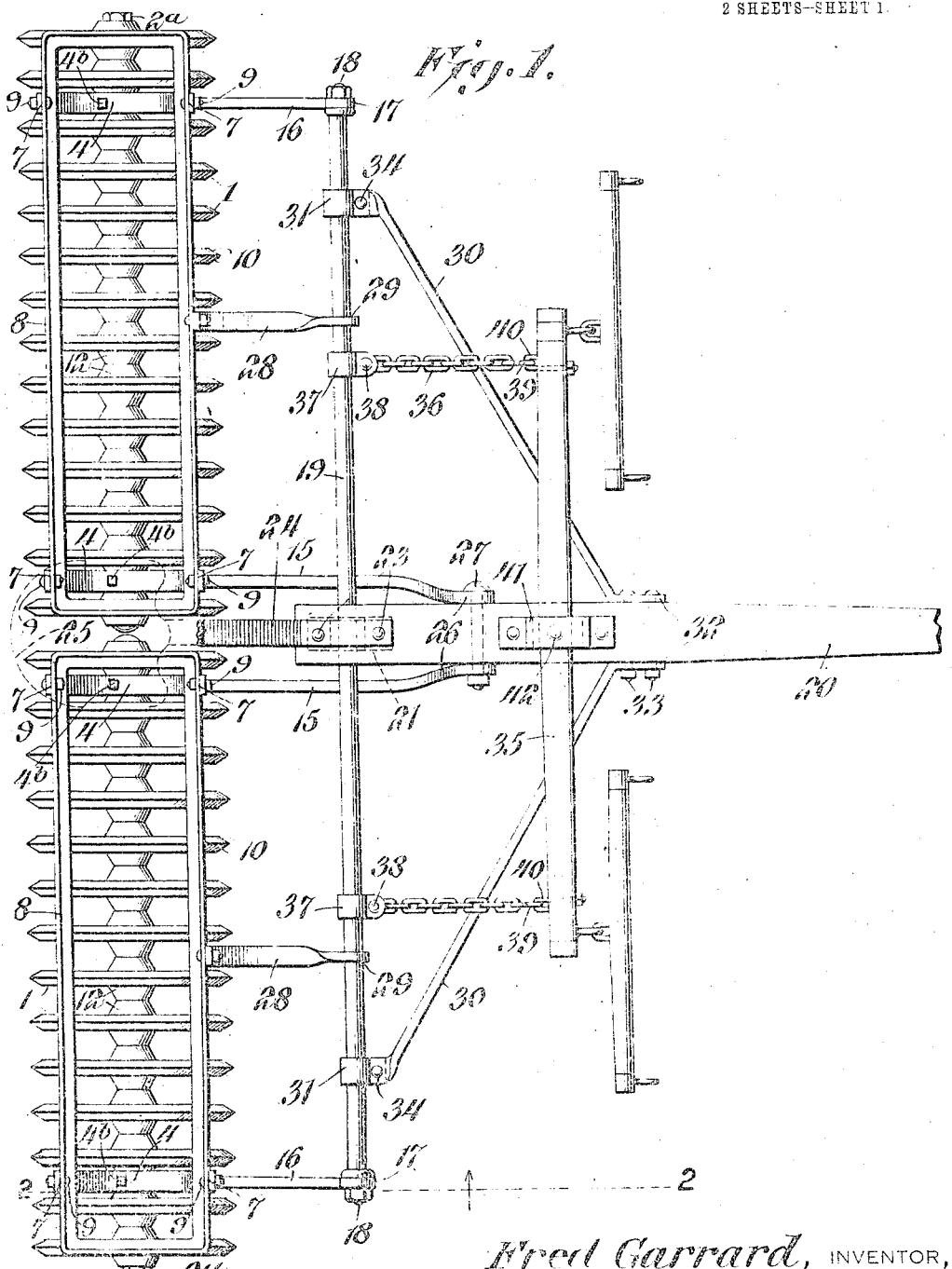

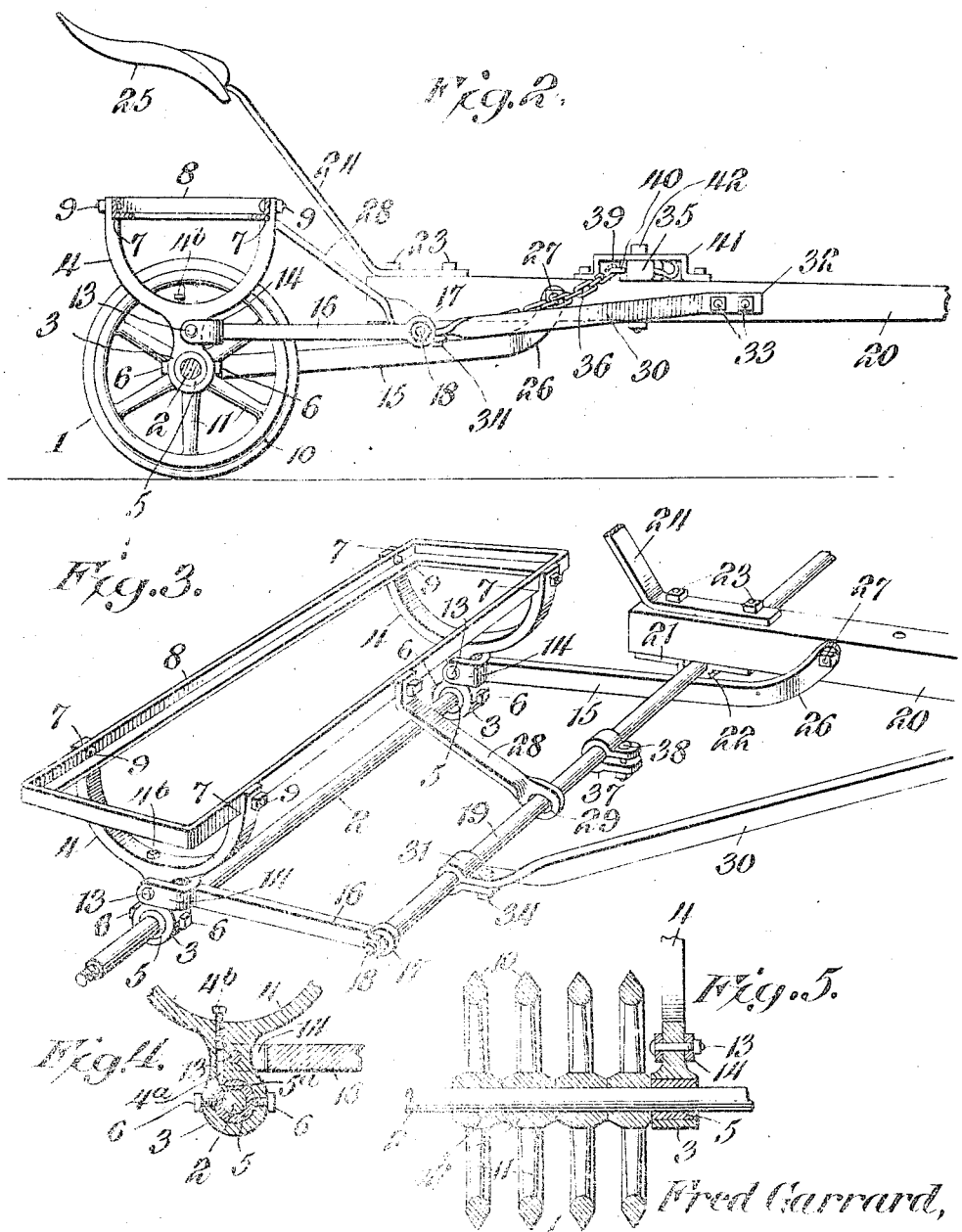

FRED GARRARD, OF KIMBALL, NEBRASKA.

SUBSURFACE LAND-PACKER.

1,045,014.  Specification of Letters Patent.  Patented Nov. 19, 1912.

Application filed March 30, 1912. Serial No. 687,497.

*To all whom it may concern:*

Be it known that I, FRED GARRARD, a citizen of the United States, residing at Kimball, in the county of Kimball and State of Nebraska, have invented a new and useful Subsurface Land-Packer, of which the following is a specification.

The invention relates to a sub-surface land packer.

The object of the present invention is to improve the construction of land packers, and to provide a simple, efficient and comparatively inexpensive land packer, equipped with a plurality of flexible sections adapted to adjust themselves to the character of the ground, whereby a uniform packing of the soil is secured.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a land packer, constructed in accordance with this invention. Fig. 2 is a longitudinal sectional view of the same on the line 2—2 of Fig. 1. Fig. 3 is a detail perspective view, illustrating the manner of yieldably mounting the sections of the packer. Fig. 4 is a detail sectional view, illustrating the manner of mounting the brackets. Fig. 5 is a detail sectional view, illustrating the manner of mounting the soil packing wheels.

Like numerals of reference designate corresponding parts in all the figures of the drawings.

In the accompanying drawings in which is illustrated the preferred embodiment of the invention, the land packer preferably comprises in its construction two separate sections or series of packing wheels 1, the series or gangs of wheels being capable of a limited independent vertical movement to adjust themselves to suit the character of the land. The sections of packing wheels are adapted to roll closer to the ground and pack the latter more evenly than a single continuous series. Loose plowed ground may be packed and by using a spiked tooth harrow on it once in a while, the surface may be kept soft and loose. This will cause the moisture to collect in the packed sub-soil, and it may be retained in the same from year to year, thereby insuring sufficient moisture at all times and enabling crops to be successfully raised where it might otherwise be impossible. The sets or series are mounted in alined transverse axles 2, journaled in suitable bearings 3 of brackets 4. The brackets 4 consist of approximately U-shaped upper portions and lower stems, and the bearings, which are arranged at the lower ends of the stems, are preferably equipped with bushings 5 of wood, or other suitable material secured in the bearings by set screws 6, or other suitable fastening means. The stems of the brackets are provided with vertical oil passages 4ª, extending from the space between the arms of the brackets downwardly through the stems and communicating with openings 5ª in the boxes or bushings 5. The oil passages, which are adapted to contain a lubricant of hard oil or grease, are threaded for the reception of screws 4ᵇ, adapted to form closures for the oil passages and for forcing the lubricant into the boxes. The brackets are located at opposite ends of the transverse axles, and the arms of the several bearing brackets are transversely alined and are provided at their upper ends with recesses 7, forming seats for horizontally disposed oblong frames 8. The oblong frames 8, which are located at opposite sides of the center of the machine, are preferably constructed of angle iron or other suitable flanged material, and are composed of front and rear sides and connecting ends, and they are secured to the front and rear sides of the frame by bolts 9, or other suitable fastening devices.

The packing wheels, which are relatively heavy, are provided with oppositely beveled rims 10, connected by spokes 11 with hubs 12, which are arranged on the axles 2. The sections of the machine may consist of any suitable number of packing wheels, and the land packer may be varied in size by removing the wheels from the ends of the sections. To facilitate this operation, the axles are preferably provided at their outer ends with nuts 2ª, and two of the packing wheels of each series are located beyond the outer bearing brackets, which may be arranged at any desired points. The oppositely beveled peripheries of the packing wheels enable them to crush clods, pulverize the soil at the surface and pack the sub-soil.

The lower portions or stems of the brackets 4 are pivoted in forks or bifurcations 14 of inner and outer links 15 and 16 by pins 13, which pierce the stems in advance of the oil passages 4ª. The outer links 16 are provided at their front ends with eyes 17, through which pass the terminals 18 of a transverse pivot bar 19, centrally secured to the lower face of the rear end of a tongue 20 by means of a clip plate 21. The clip plate 21, which is provided at its center with a bowed or bent portion 22 to receive the pivot bar, is fastened to the tongue by means of vertical bolts 23, which also pierce the lower end of a spring standard 24 of a seat 25 for the accommodation of the driver.

The transverse pivot bar is arranged in advance of and in parallelism with the two series of packing wheels, and the inner longitudinal links 15, which are of greater length than the outer links, extend beneath the transverse pivot bar and have their front portions 26 curved upward and arranged at opposite sides of and pivoted to the side faces of the tongue in advance of the transverse pivot bar by means of a transverse bolt 27, or other suitable fastening device. The series of wheels are adapted to swing upwardly and downwardly on the pivots of the front ends of the links 15 and 16, and the inner links 15 are arranged to swing against the transverse pivot bar to limit the relative upward movement of the packing wheels, so that the same will be held in the ground by the weight of the driver in addition to their own weight and the weight of the oblong frames, which form convenient means for mounting weighted boxes or receptacles upon the machine. The frames are maintained in an upright position by inclined braces 28, bolted or otherwise secured at their rear upper ends to the front side bars of the frames at the centers thereof, and provided at their lower front ends with openings 29, through which the transverse pivot bar passes. The openings 29 are elongated to permit the necessary play of the parts incident to the up and down or vertical movement of the frames through the pivoted longitudinal links, and the said braces do not interfere with such up and down movement. The inner and outer longitudinal links owing to their difference in length have a different arc of movement, and while they do not permit an unlimited movement of the packing wheels, such movement is sufficient, but the up and down movement of the series of packing wheels is sufficient to enable them to adjust themselves to the character of the land operated on.

The outer portions of the transverse pivot bar are connected with the tongue by rearwardly diverging side braces 30, provided at their rear ends with eyes 31 to receive the pivot bar and having their front terminals 32, bent at an angle and secured to the side faces of the tongue by transverse bolts 33. The rear ends of the braces 30 are arranged at an angle to the diverging portions and are bent to form the eyes 31, the rear terminals of the metal of the braces being secured by bolts 34, or other suitable fastening means to the body portion of the braces in advance of the eyes 31. The transverse pivot bar is also connected at opposite sides of the tongue with the end portions of a doubletree 35 by stay chains 36, or other flexible connections. The stay chains 36 are secured at their rear ends to the transverse pivot bar by clamping collars 37, arranged on the pivot bar and having forwardly extending terminals, pierced by vertical bolts 38, which also pass through the end links of the chains 36. The chains 36 are equipped at their front ends with hooks 39, which detachably engage eye bolts 40. The eye bolts 40, which are horizontal, pierce the end portions of the doubletree, being provided at their rear ends with eyes and at their front ends with nuts. The doubletree is pivoted to the tongue preferably at the upper face thereof by a vertical bolt 41, and is braced by a metallic stop 42. While I have illustrated in the drawings a transverse pivot bar as consisting of a single continuous piece, yet it will be apparent that it may be made up of two or more sections of tubular or other metal, connected together by couplings, or any other suitable means.

What is claimed is:—

1. A land packer of the class described comprising a tongue, a transverse pivot bar connected with and extending from opposite sides of the tongue, separate sets or series of packing wheels located in rear of the transverse pivot bar, outer longitudinal links connecting the series of packing wheels with the pivot bar, and inner links connected with the packing wheels and extending beneath the pivot bar and pivoted to the tongue, the links being arranged to swing upwardly and downwardly and the said pivot bar constituting a stop for limiting the relative upward movement of the packing wheels.

2. A land packer of the class described including a tongue, a transverse pivot bar connected with and extending from opposite sides of the tongue, axles located in rear of the pivot bar, packing wheels mounted on the axles, frames having bearing brackets receiving the axles and inner and outer links pivoted to the bearing brackets and pivotally connected, respectively, with the tongue and the pivot bar and having an upward and downward swinging movement, the inner links being extended beneath the pivot bar, which limits the relative upward movement of the packing wheels.

3. A land packer of the class described including a tongue, a transverse pivot bar connected with and extending from opposite sides of the tongue, axles located in rear of the pivot bar, packing wheels mounted on the axles, frames having bearing brackets receiving the axles, inner and outer links pivoted to the bearing brackets and pivotally connected, respectively, with the tongue and the pivot bar and having an upward and downward swinging movement, the inner links being extended beneath the pivot bar, which limits the relative upward movement of the packing wheels, and swinging braces fixed to the frames and connected with the pivot bar and maintaining the said frames in an upright position.

4. A land packer of the class described including a tongue, a transverse pivot bar extending from opposite sides of the tongue, transverse frames, bearing brackets supporting the frame, and inner and outer links pivoted at their rear ends to the bearing brackets and having their front ends pivotally connected, respectively, with the tongue and the transverse pivot bar, and arranged to swing upwardly and downwardly, the said pivot bar extending across the inner links for limiting the upward movement of the same.

5. A land packer of the class described including a tongue, a transverse pivot bar extending from opposite sides of the tongue, oblong frames located in rear of the tongue, inner and outer bearing brackets having approximately U-shaped upper portions supporting the said frame, inner and outer links pivoted to the lower portions of the bearing brackets, the outer links being connected to the pivot bar and the inner links being extended beneath the same and pivoted to the tongue, and inclined braces extending from the pivot bar to the frames and supporting the latter in an upright position.

6. A land packer of the class described including a tongue, a transverse pivot bar connected therewith, an axle located in rear of the pivot bar, an oblong frame, bearing brackets consisting of upwardly extending arms supporting the frame, and lower stems having bearings, an axle arranged in the bearings, packing wheels mounted on the axle, inner and outer links having forked rear ends receiving and secured to the stems of the bearing brackets, the outer link being pivoted at its front end by the said pivot bar and the inner link being extended beneath the pivot bar and pivoted to the tongue.

In testimony, that I claim the foregoing as my own, I have hereto affixed my signature in the presence of two witnesses.

FRED GARRARD.

Witnesses:
VERNON LINN,
HENRY VOGLER.